(12) United States Patent
Collin et al.

(10) Patent No.: US 10,689,195 B2
(45) Date of Patent: Jun. 23, 2020

(54) SYSTEM OF BUFFER STORAGE AND SEQUENCING OF LOADS UPSTREAM TO AT LEAST ONE PREPARING STATION

(71) Applicant: SAVOYE, Dijon (FR)

(72) Inventors: Jean-Michel Collin, Merceuil (FR); Stephane Pietrowicz, Fixin (FR)

(73) Assignee: SAVOYE, Dijon (FR)

(*) Notice: Subject to any disclaimer, the term of this patent is extended or adjusted under 35 U.S.C. 154(b) by 0 days.

(21) Appl. No.: 16/064,903

(22) PCT Filed: Dec. 6, 2016

(86) PCT No.: PCT/EP2016/079813
§ 371 (c)(1),
(2) Date: Jun. 21, 2018

(87) PCT Pub. No.: WO2017/108383
PCT Pub. Date: Jun. 29, 2017

(65) Prior Publication Data
US 2019/0002202 A1   Jan. 3, 2019

(30) Foreign Application Priority Data

Dec. 22, 2015   (FR) ..................... 15 63151

(51) Int. Cl.
*B65G 1/137*   (2006.01)
*B65G 1/06*    (2006.01)
*B65G 1/04*    (2006.01)

(52) U.S. Cl.
CPC ............. *B65G 1/1378* (2013.01); *B65G 1/04* (2013.01); *B65G 1/0485* (2013.01); *B65G 1/06* (2013.01)

(58) Field of Classification Search
CPC .................... B65G 41/04; B65G 1/04
See application file for complete search history.

(56) References Cited

U.S. PATENT DOCUMENTS 8,480,347 B2    7/2013  Schafer
9,676,562 B2 *  6/2017  Philipp .............. B65G 47/5113
(Continued)

FOREIGN PATENT DOCUMENTS

CA    2735988 A1 *  3/2010  .......... B65G 1/0492
CA    2735988 A1    3/2010
(Continued)

OTHER PUBLICATIONS

International Search Report dated Jan. 24, 2017, for corresponding International Application No. PCT/EP2016/079813, filed Dec. 6, 2016.
(Continued)

*Primary Examiner* — Gene O Crawford
*Assistant Examiner* — Lester Ill Rushin
(74) *Attorney, Agent, or Firm* — David D. Brush; Westman, Champlin & Koehler, P.A.

(57) ABSTRACT

A system of buffer storage and sequencing of loads is configured to receive non-sequenced loads coming from at least one external unit and to provide sequenced loads to at least one preparing station. The system includes: a reciprocating lift having a single nacelle with K levels each enabling transportation of at least one load with K≥2; at least one buffer storage unit; and a managing unit configured to organize first movements of loads from at least one inbound forward conveyor to the at least one buffer storage unit through the reciprocating lift, and second movements of loads from the at least one buffer storage unit to at least one outbound forward conveyor through the reciprocating lift.

16 Claims, 14 Drawing Sheets

(56) References Cited

U.S. PATENT DOCUMENTS

| | | |
|---|---|---|
| 2004/0193311 A1 | 9/2004 | Winkler |
| 2006/0245858 A1 | 11/2006 | Suess |
| 2015/0336741 A1 | 11/2015 | Ahammer et al. |
| 2016/0031643 A1 | 2/2016 | Collin et al. |

FOREIGN PATENT DOCUMENTS

| | | | |
|---|---|---|---|
| EP | 1681247 A1 | 7/2006 | |
| EP | 2949604 A1 | 12/2015 | |
| EP | 2979996 A1 | 2/2016 | |
| EP | 3135609 A1 * | 3/2017 | ........... B65G 1/0407 |
| FR | 2967145 A1 | 5/2012 | |
| JP | S60262703 A | 12/1985 | |
| WO | 9113011 A1 | 9/1991 | |
| WO | 2008089980 A1 | 7/2008 | |
| WO | 2014023730 A1 | 2/2014 | |

OTHER PUBLICATIONS

Written Opinion of the International Searching Authority dated Jan. 24, 2017, for corresponding International Application No. PCT/EP2016/079813, filed Dec. 6, 2016.

English Translation of Written Opinion of the International Searching Authority dated Jan. 31, 2017, for corresponding International Application No. PCT/EP2016/079813, filed Dec. 6, 2016.

* cited by examiner

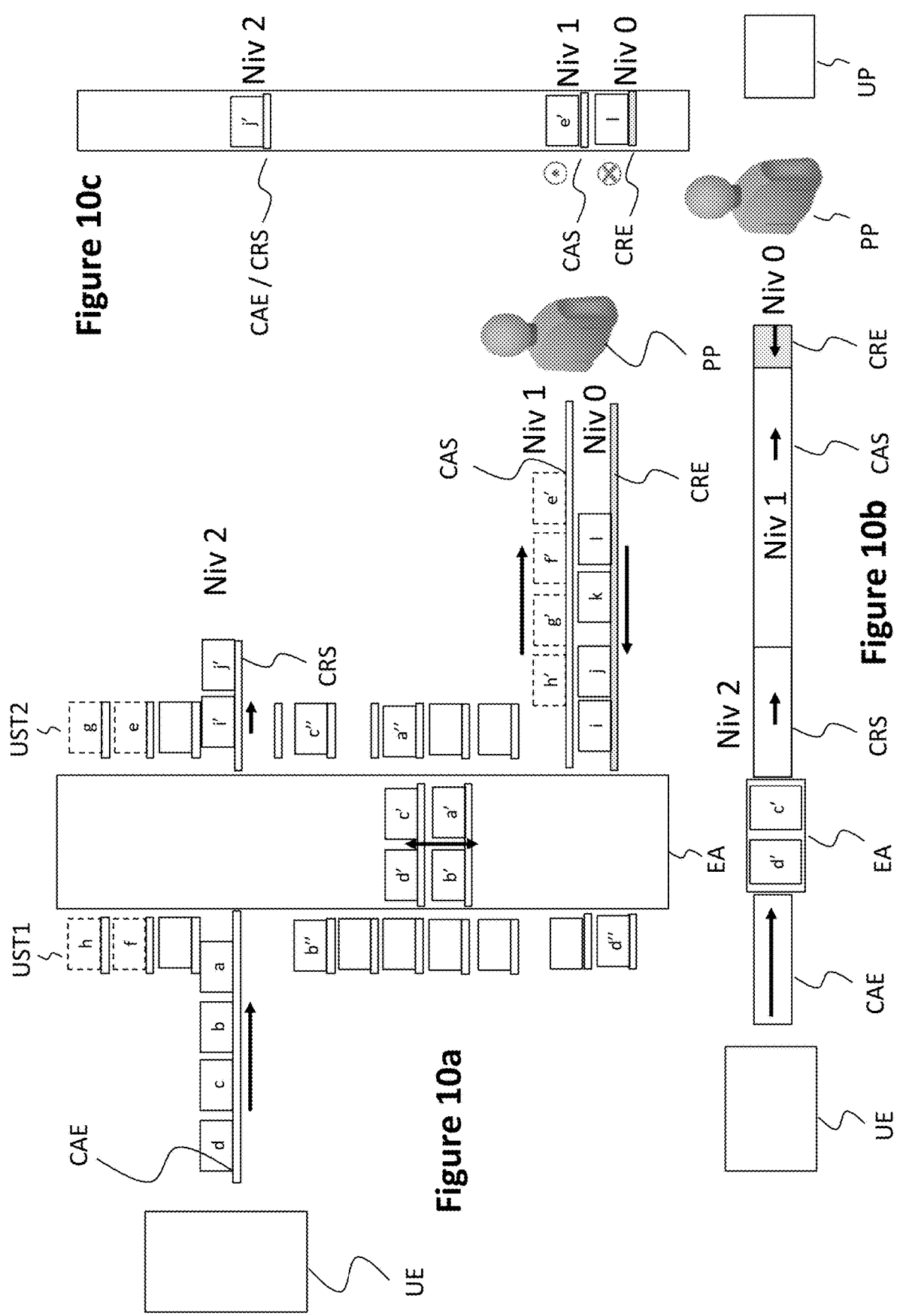

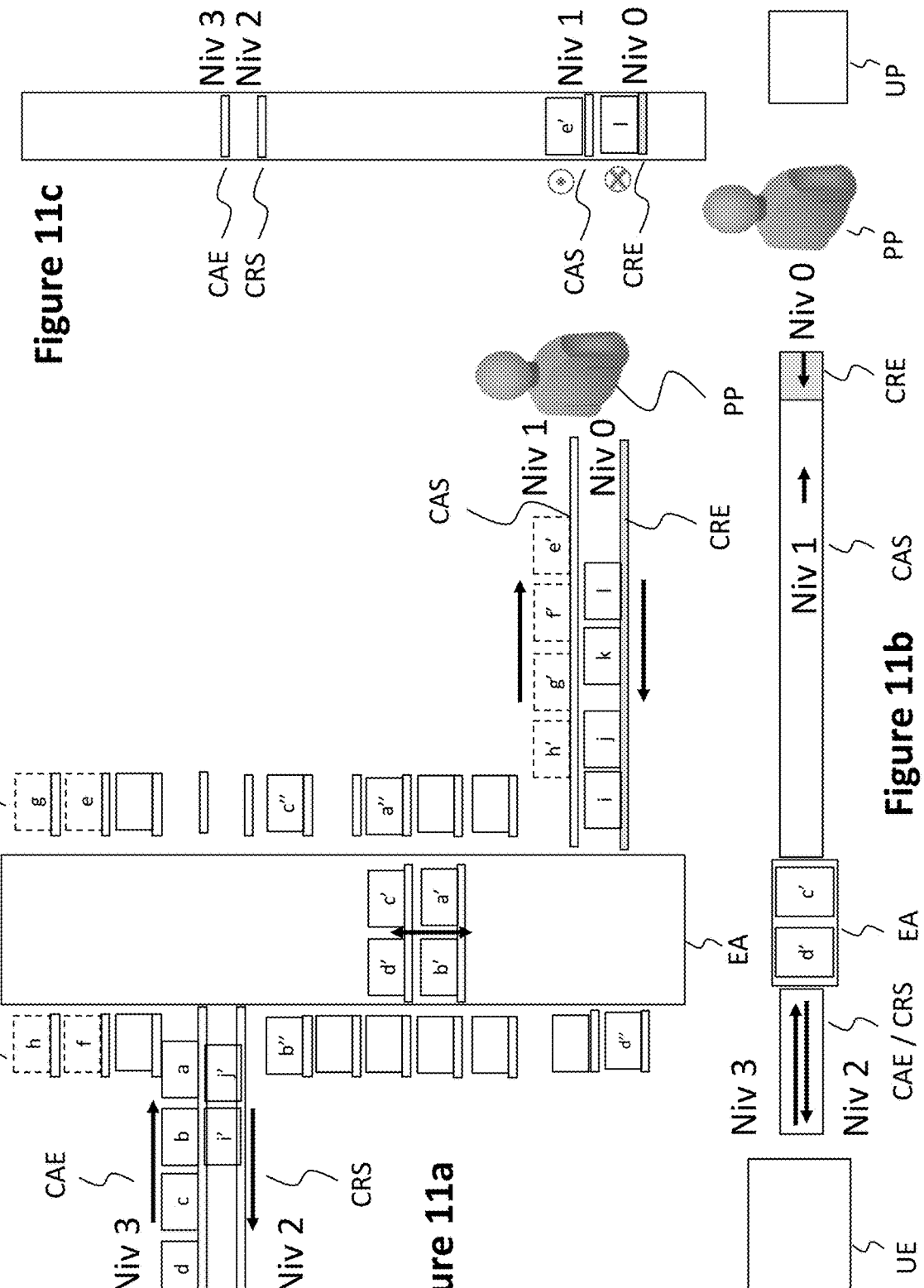

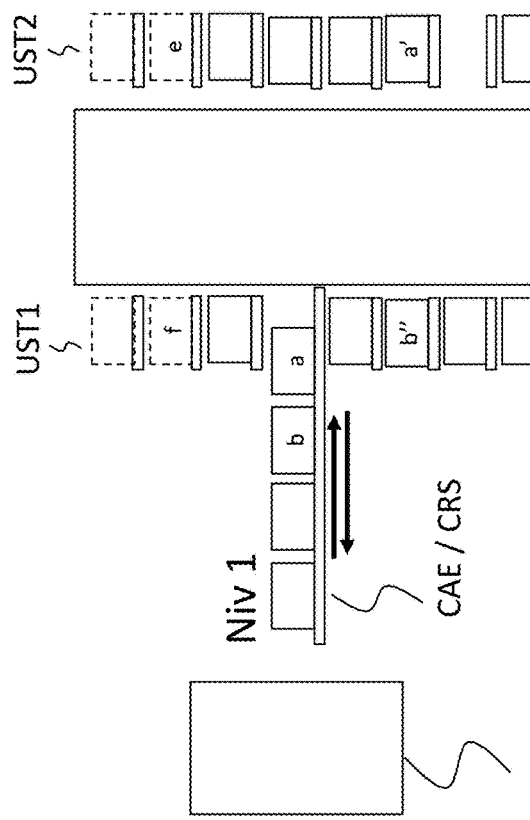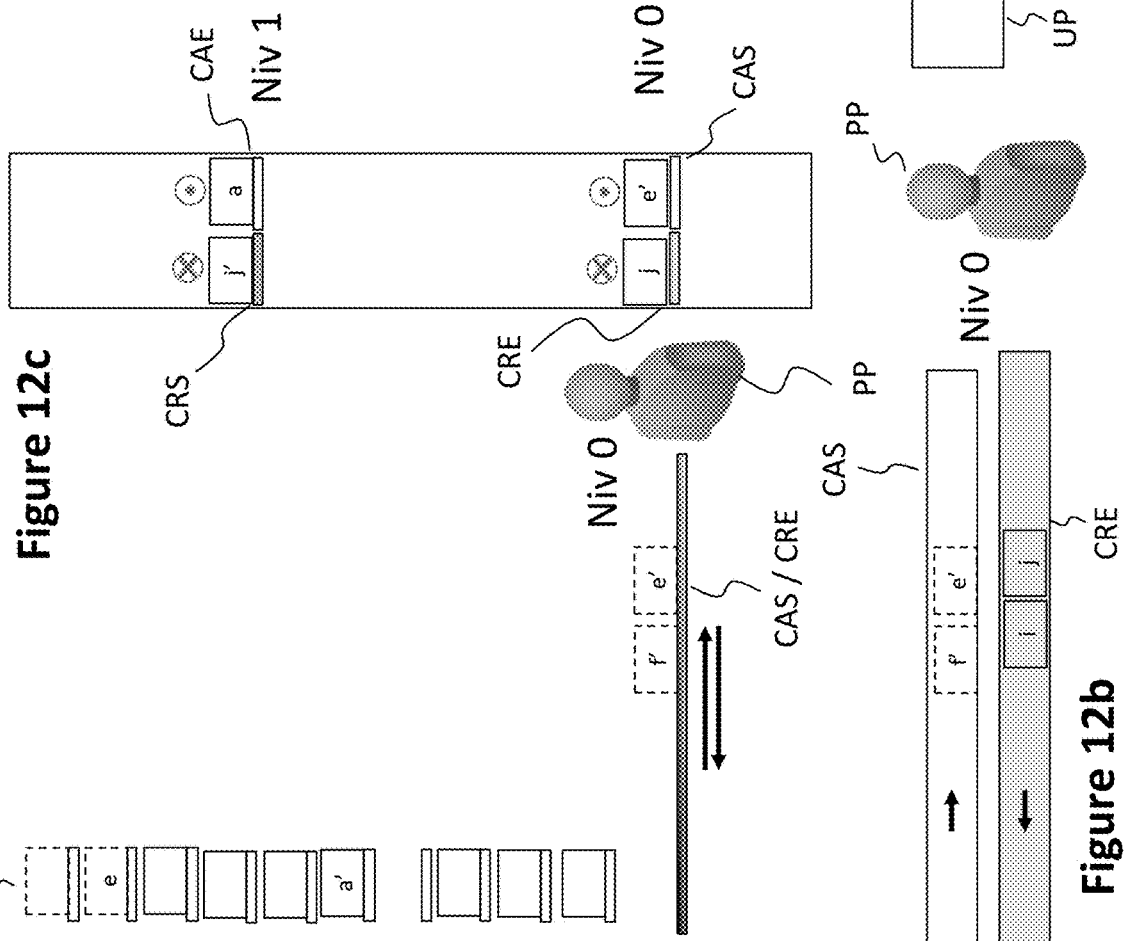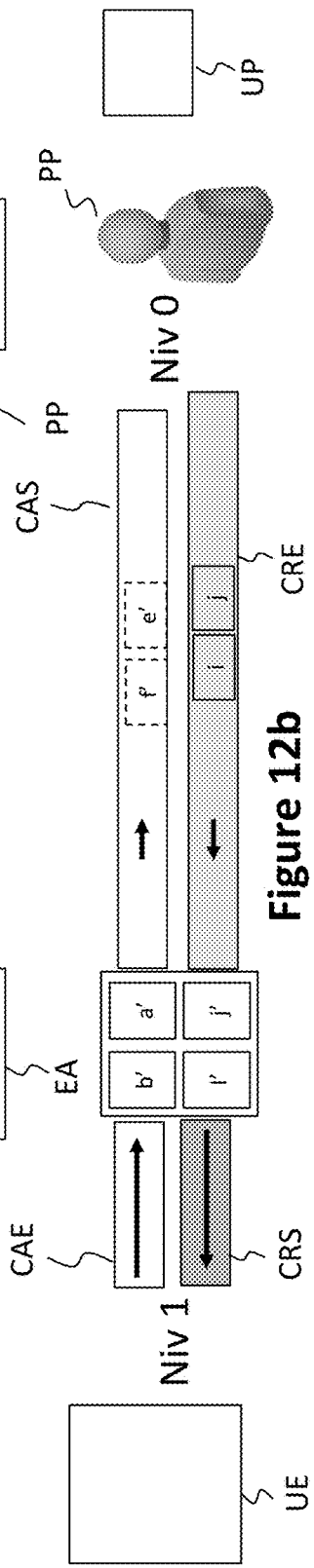
Figure 12a
Figure 12b
Figure 12c

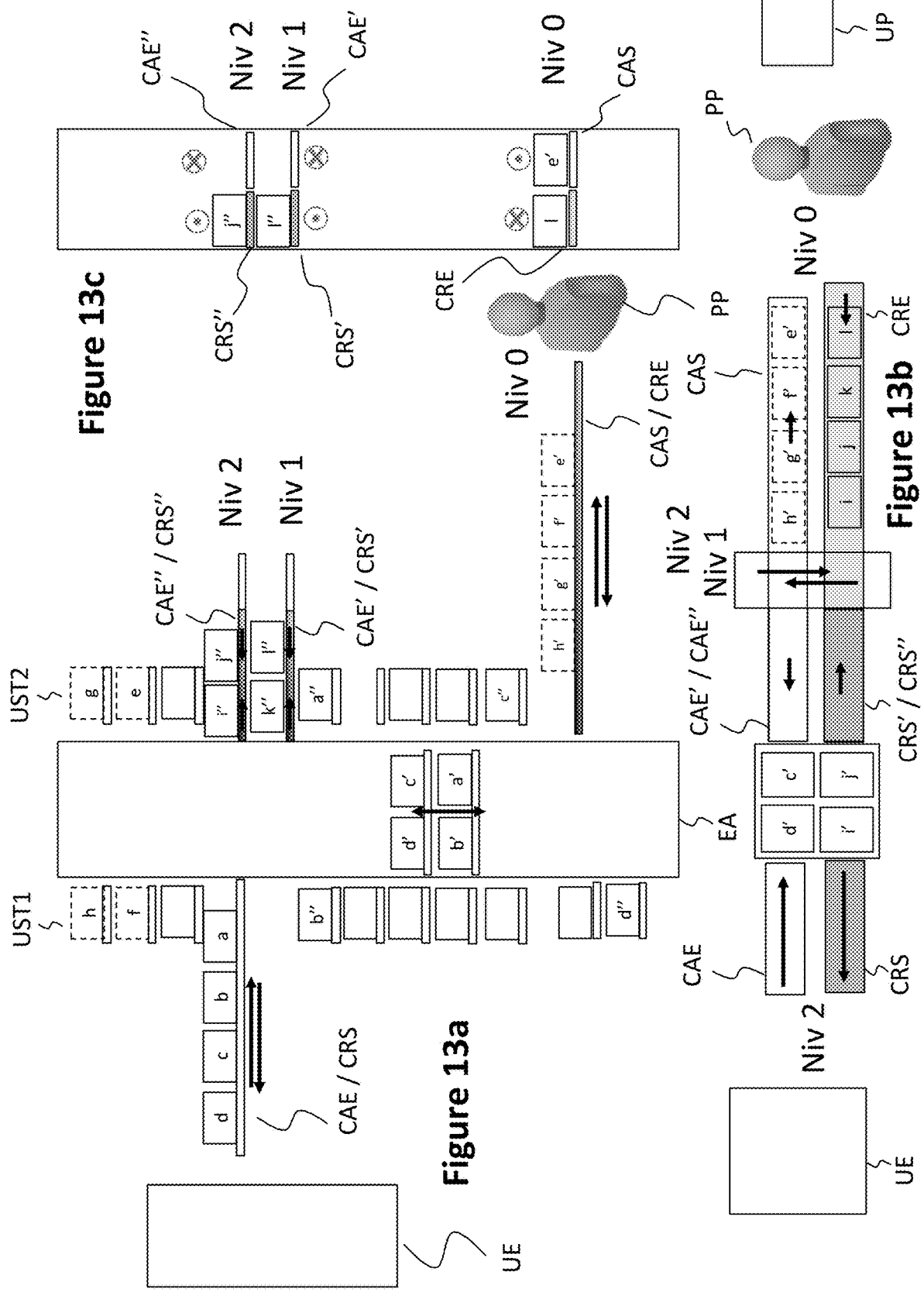

SYSTEM OF BUFFER STORAGE AND SEQUENCING OF LOADS UPSTREAM TO AT LEAST ONE PREPARING STATION

CROSS-REFERENCE TO RELATED APPLICATIONS

This Application is a Section 371 National Stage Application of International Application No. PCT/EP2016/079813 filed Dec. 6, 2016, the content of which is incorporated herein by reference in its entirety, and published as WO 2017/108383 on Jun. 29, 2017, not in English.

TECHNICAL FIELD

The field of the invention is that of logistics.

The present invention relates more specifically to a system of a buffer storage and sequencing of loads, configured to receive non-sequenced loads coming from at least one external unit (for example an automated storage/removal warehouse) and provide sequenced loads to at least one preparing station. The term "supply of sequencing loads" is understood to mean the supply, under a delivery constraint, of at least one sequence comprising loads in a desired sequential order.

The present invention can be applied to any type of preparing station, and especially but not exclusively:

to order-preparing stations (also called "picking stations") where the preparing is done by the picking of items or goods from a storage containers (also called "load sources"): an operator (or a robot) receives a pick list (on paper, on a terminal screen, in voice form, or in the form of computer task (when it is a robot), etc.). For each package to be shipped (also called a "shipping container" or "target load"), this list informs the operator or robot about the quantity of each type of items or goods that be or it must collect in storage containers and group together in the package to be shipped; and to stations for the palletization of storage containers (also called "source loads") themselves containing items: an operator (or a robot) receives a pick list (on paper, on a computer screen, in voice form, in the form of a computer task (when it is a robot), etc.). For each pallet to be shipped (also called a "shipping container" or "target load"), this list informs the operator or robot about the quantity of storage containers of each type (for example cardboard boxes) that he must collect and unload onto the pallet to be shipped.

TECHNOLOGICAL BACKGROUND

Referring now to FIG. 1, a top view is presented of an example of a known configuration for an automated storage system for preparing customer orders comprising:

an automated storage/removal warehouse 7 comprising several sets (two in this example) each formed by an alley 7a, 7a' feeding, on either side, a storage shelf 7b, 7c, 7b', 7c' with several superimposed stacking levels;

a set of conveyors taking the source loads from the warehouse up to the preparing stations and vice versa. In the example of FIG. 1, we can distinguish:

for the forward operation (i.e. from the automated warehouse 7 up to the preparing stations), conveyors referenced 9a and 9a' (one per alley) as well as 6 and 8; and
for the return operation (i.e. from the preparing stations up to the automated warehouse 7), conveyors referenced 8', 6' as well as 9b and 9b' (one per alley); in this example, the conveyor 6' and 8' are superimposed on the conveyors 6 and 8;

several customer-order preparing stations 10a to 10f, each occupied by an operator 1a to 1f and extending perpendicularly to the conveyors referenced 8 and 8'; and a managing system (also called a managing unit) that is a computer-based central managing system responsible for managing the entire (automated storage/removal) system 7, the set of conveyors 6, 6', 8, 8', 9a, 9a', 9b and 9b' and the preparing stations 10a to 10f).

The managing system also manages the list of customer orders associated with each shipping container (target load) and therefore the sequential order of the customer order lines forming this list, as a function of the location of the storage containers (source loads) in the warehouse, the availability of the trolleys and the elevators of the automated warehouse 7 as well as the needs in terms of items and goods of the different shipping containers to be prepared that succeed one and other at the preparing station. The purpose of this is to optimize all the movements and the preparation times for the shipping containers and ensure synchronization between the arrival, at the preparation station, of a shipping container and the corresponding storage containers (containing goods indicated in the customer order list associated with this storage container).

In the example of FIG. 1, each preparing station comprises two conveyor circuits: a first conveyor circuit for the storage containers, formed by two horizontal columns of conveyors; one column (the forward column 2) for shifting these storage containers from the third sub-assembly of conveyors 8 up to the operator 1a and the other (the return column 3) for the reverse shift; and a second circuit of conveyors for the shipping containers, formed by two horizontal columns of conveyors: one (forward column 4) for shifting the shipping containers from the third sub-assembly of conveyors 8 up to the operator 1a and the other (return column 5) for the reverse shift.

A buffer storage function (also called a "accumulation function") for a determined quantity of containers upstream to the operator (or automaton) is set up in each of the first and second circuits, by the forward column 2 and 4 (consisting of classic horizontal conveyors). A storage container therefore makes the following journey: it is picked up by a trolley in the automated warehouse 7, and is then conveyed successively by one of the conveyors 9a and 9a' (depending on whether it arrives at the alley 7a or 7a') and by the conveyors 6 and 8 and finally by the conveyors of the forward column 2 to be presented to the operator. In the other direction (after presentation to the operator), the storage container makes the reverse journey: it is conveyed by the conveyors of the return column 3, then by the conveyors 8' and 6' and finally by one of the conveyors 9b and 9b' (depending on whether it is returning to the alley 7a or 7a') and is then re-positioned in the automated warehouse 7 by means of a trolley.

As mentioned further above, the containers (source loads and target loads) must be presented to the operator in a desired sequential order forming at least one determined sequence. Classically, this sequential order of arrival is pre-determined by the managing system (i.e. it is determined, for each container, before this container reaches the preparing station) and, if necessary, recomputed during the conveyance of the containers from the exit of the automated warehouse 7 to the preparing station (for example to take account of a malfunctioning of an element of the system).

In a first known (standard) implementation, a first sequencing level is made by the deposition, on each of the conveyors 9a and 9a', of the pre-sequenced loads (there are therefore constraints on the automated warehouse 7). In other words, the loads deposited on the conveyor 9a are in a sequential order consistent with that of the final desired sequential order and the loads deposited on the conveyor 9a' are also in a sequential order consistent with that of the final desired sequential order. Then, a second level of sequencing is made through the deposition on the conveyor 6, in the final desired sequential order, of the loads coming from the conveyors 9a and 9a'. For example, for a sequence of seven loads, if the loads of ranks 1, 2, 4 and 5 are stored in the alley 7a, they are deposited in this order on the conveyor 9a and if the loads of the ranks 3 and 6 are stored in the alley 7a', they are deposited in this order on the conveyor 9a'; then, the seven loads are deposited on the conveyor 6 in ascending order (from 1 to 7) of their ranks.

In a second known implementation, in order to relax the constraints on the automated warehouse 7, it is accepted that the containers will not exit the automated warehouse 7 in the desired sequential order (i.e. the order in which they must be presented to the operator). An operation therefore needs to be carried out for sequencing the containers between the automated warehouse 7 and the preparing station where the operator is situated. The elimination of the sequencing constraints that usually weigh on the automated warehouse 7 significantly increases the performance of this automated warehouse (and generally of the different upstream devices) and therefore enables a reduction of its size and complexity and therefore its cost. In the example of FIG. 1, this sequencing operation is performed as follows: the storage containers circulate in a loop on the conveyors 6, 8, 8' and 6' and when the storage containers awaited on the conveyors of the forward column 2 come before this column (in order to complete the sequence of storage containers awaited at the preparing station), this storage container is transferred to the conveyors of the forward column 2, the other storage containers continuing to circulate in the above-mentioned loop (containers 6, 8, 8' and 6'). This method is performed for each of the storage containers awaited in the sequence (i.e. in the desired sequential order of arrival at the preparing station).

The two known implementations (based on classic horizontal conveyors) mentioned here above for carrying out the buffer (accumulation) storage functions and sequencing functions have several drawbacks.

First of all, they consumer an excessive of amount of $m^2$ for a smaller running surface height (750 mm typically). An example of this excessive footprint is the fact that the surface area needed for six order-preparing stations (as in the example of FIG. 1) is about 100 $m^2$.

Another drawback is that the density on the ground of classic horizontal conveyors (in the preparing stations) is such that it makes it difficult to obtain maintenance access to these conveyors (the conveyor coverage area is too dense).

Another drawback is that, without further increasing the footprint of the preparing station (by increasing the length of the forward column of each of the first and second circuits), it is not possible to increase the number of containers that can accumulate (by buffer storage) upstream to the operator (or automaton).

The invention, in at least one embodiment, is aimed especially at providing a system of buffer storage and sequencing of loads that can overcome the drawbacks of the prior art technique of FIG. 1.

SUMMARY OF THE INVENTION

In one particular embodiment of the invention, a system of buffer storage and sequencing of loads is proposed, configured to receive non-sequenced loads coming from at least one external unit through at least one inbound forward conveyor included in said system and to provide sequenced loads to at least one preparing station through at least one outbound forward conveyor included in said system, said system comprising:

a reciprocating lift (also referred to as "alternating elevator") comprising a single nacelle comprising K levels each enabling the transportation of at least one load with K≥2;

at least one buffer storage unit comprising a plurality of buffer locations distributed over a plurality of levels and each configured to temporarily receive at least one load coming from the reciprocating lift; and a managing unit configured to organize:
first movements of loads from said at least one inbound forward conveyor to said at least one buffer storage unit through the reciprocating lift; and
second movements of loads from said at least one buffer storage unit to said at least one outbound forward conveyor through the reciprocating lift under a constraint of delivery on said at least one outbound forward conveyor of at least one sequence comprising loads in a given sequential order.

The general principle of the proposed system consists in performing buffer storage and load sequencing functions through the use, according to a wholly novel and inventive approach, of a multi-level reciprocating lift (with a single nacelle comprising K levels) in combination with at least one buffer storage unit, under the control of a managing unit configured to organize first movements and second movements of loads.

Said at least one external unit (which gives non-sequenced loads) belongs for example to the following non-exhaustive list: an automated storage/removal warehouse and at least one other buffer storage and load sequencing system.

The sequencing (scheduling) capacity of the proposed system is linked to the quantity of loads that can be stored temporarily in the at least one buffer storage unit.

The proposed solution has numerous advantages, especially but not exclusively:
minimizing the constraints of sequencing at exit from the external unit or units by a sequencing downstream from these units and as close as possible to the preparing stations: this minimizing of constraints reduces the size and complexity and therefore the cost of the external unit or units;
reducing the footprint;
optimizing the efficiency of the overall system (including especially the external unit or units, the buffer storage and sequencing system and the preparing stations);
optimizing the reactivity of the overall system;
handling of multiple-format loads if motor-driven rollers are used;
optimizing costs if the overall system comprises several preparing stations (pooling of the buffer storage and sequencing system);
etc.

At the exit from the buffer storage and sequencing system several types of sequences of loads can be obtained, especially but not exclusively:
a sequence comprising solely source loads, each source load being a storage container of goods or items; or a sequence comprising solely target loads, each target load being a container for shipping an item or items; or a sequence comprising a target load, which is a container for shipping an item or items followed by at least one source load which is a storage container for an item or items.

Several buffer and storage sequencing systems (each made according to the proposed solution) can be used in parallel. For example, upstream to at least one preparing station, a first buffer storage and sequencing system is used solely for source loads and, in parallel, a second buffer storage and sequencing system is used solely for target loads.

Various implementations and characteristics are specified in the set of claims. They are also described in detail (with their associated advantages) and illustrated through examples in the rest of description.

LIST OF FIGURES

Other features and advantages of the invention shall appear from the following description, given by way of a non-exhaustive and indicatory example and from the appended drawings of which:

FIG. 1, already described with reference to the prior art, is a top view of an automated customer-order preparing system;

FIGS. 10a, 10b and 10c are a side view, a top view and a front view respectively of a ninth example of a buffer storage and load sequencing system according to the invention;

FIGS. 11a, 11b and 11c are a side view, a top view and a front view respectively of a tenth example of a buffer storage and load sequencing system according to the invention;

FIGS. 12a, 12b and 12c are a side view, a top view and a front view respectively of an eleventh example of a buffer storage and load sequencing system according to the invention;

FIGS. 13a, 13b and 13c are a side view, a top view and a front view respectively of a twelfth example of a buffer storage and load sequencing system according to the invention.

DETAILED DESCRIPTION

Figure 2:
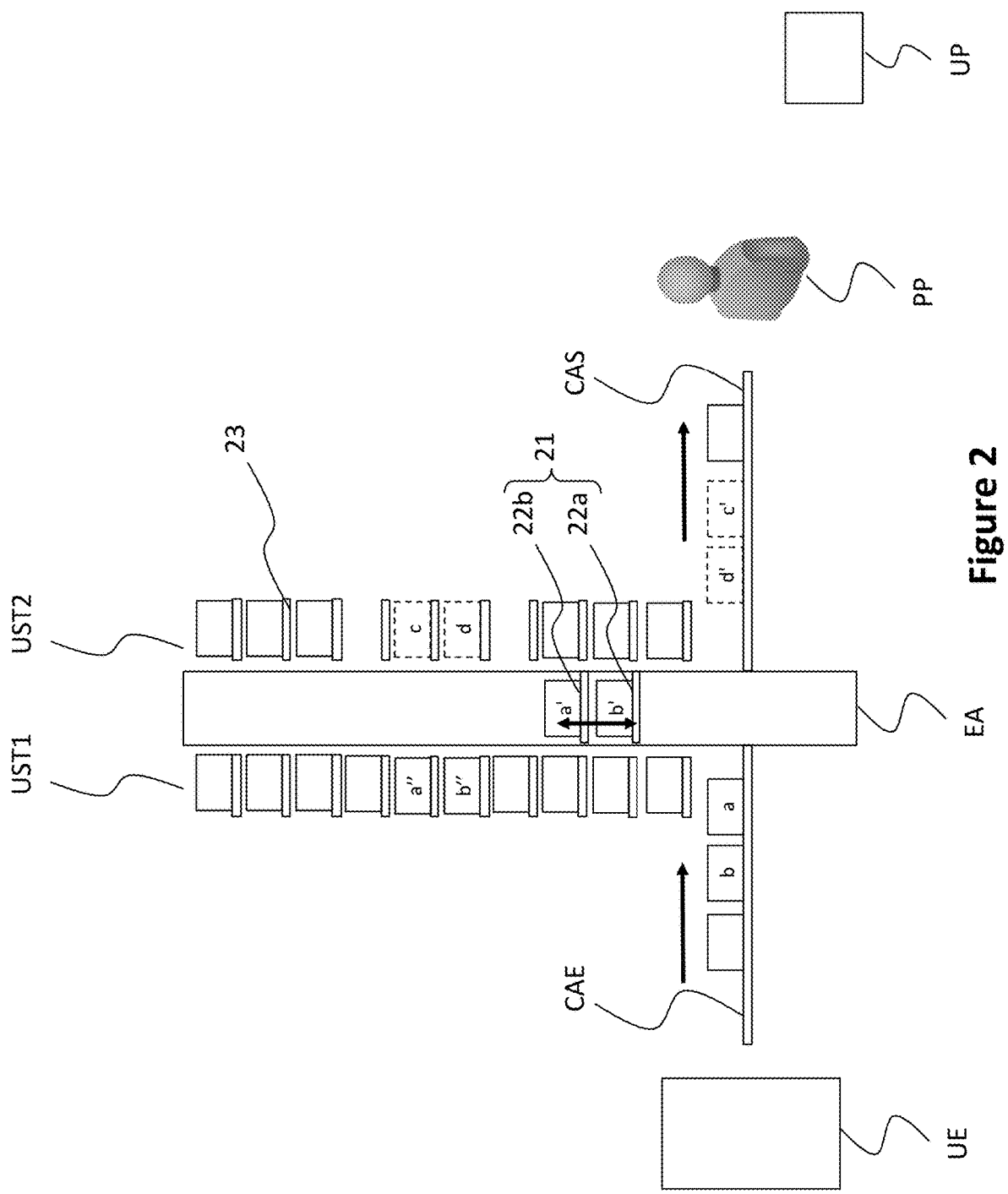
FIG. 2 is a side view of a first example of a buffer storage and load sequencing system according to the invention.

FIG. 2 illustrates a first example of a buffer storage and load sequencing system according to the invention. It is configured to receive non-sequenced loads coming from an external unit UE through an inbound return conveyor CAE and to provide sequenced loads to a preparing station PP (occupied by an operator or a robot) via an outbound forward conveyor CAS. The external unit UE is for example an automated storage/removal warehouse.

In one variant, the external unit UE is another buffer storage and load sequencing system. In another variant, the buffer storage and load sequencing system receives non-sequenced loads coming from several external units (either via several inbound forward conveyors CAE each specific to one of the external units or via an inbound forward conveyor CAE used jointly by several external units).

The buffer storage and load sequencing system comprises a reciprocating lift EA, two buffer storage units UST1, UST2 and one managing unit UP.

The reciprocating lift EA is a vertical discontinuous type elevator comprising a single nacelle 21 carrying out alternating vertical movements (the nacelle rises and descends in alternation). By opposition, a "continuous elevator" (also called a paternoster) is a vertical elevator comprising a plurality of nacelles moving in a closed loop without alternating motion. The single nacelle 21 comprises K levels, with K≥2 each comprising a location (or a position) configured to receive a load. In the example illustrated in FIG. 2, the single nacelle 21 comprises two levels 22a, 22b (K=2).

The reciprocating lift therefore has a capacity of 2×1 loads. Each of the nacelle locations is for example equipped with a motor-driven conveyor section (or any other transfer device) used to transfer a load onto or out of the nacelle. In one variant, each nacelle location is equipped with idle rollers or idlers, which are put into motion for example by collapsible mechanical means positioned at the end of the other device (buffer conveyor or location). Other means for putting into motion can be envisaged.

Each of the two buffer storage units UST1, UST2 comprises a plurality of buffer locations 23, distributed over a plurality of levels (one buffer location per level) and each location is configured to temporarily receive at least one load coming from the reciprocating lift. The two buffer storage units UST1, UST2 are disposed vertically on either side of the reciprocating lift EA. Each of the levels of the nacelle of the reciprocating lift EA can come to a position of facing each of the levels of each of the buffer storage units UST1, UST2 for a transfer of at least one load. The use of two buffer storage units, disposed in this way, increases the capacity and operating rate of the buffer storage and sequencing system.

In one particular implementation that enables the movements of the reciprocating lift EA to be limited, the pitch (i.e. the spacing between two successive levels) of the nacelle of the reciprocating lift EA is equal to the pitch (i.e. the spacing between two successive levels) of the buffer storage unit UST1, UST2 or is a multiple of this pitch.

The managing unit UP carries out the optimal organizing of the movements of the loads in the system, especially on the reciprocating lift EA and the buffer storage units UST1, UST2, in order to make source loads available on the outbound forward conveyor CAS according to a determined sequence. To this end, the managing unit UP receives information (especially a load identifier) on the loads passing through different places of the system, read by reading devices (not shown) such as a bar code reader, RFID label reader, etc. These places are for example situated at the extremities of the conveyors.

More specifically, the managing unit UP organizes first movements of loads from the inbound forward conveyor CAE towards the buffer storage units UST1, UST2 via the reciprocating lift EA. It also organizes second movements of loads from the buffer storage units UST1, UST2 towards the outbound forward conveyor CAS via the reciprocating lift EA, under a constraint of delivery, on the outbound forward conveyor CAS, of at least one sequence comprising loads in a desired sequential order.

In one particular implementation, a part of the first movements of loads is carried out at the same time as a part of the second movements of loads.

For example, the managing unit UP is configured to organize whenever possible:

a transfer of first loads (for example those denoted as "a" and "b" in FIG. 1) from the reciprocating lift EA to the buffer storage units UST1, UST2 at the same time as a transfer of second loads (for example those denoted as "c" and "d" in FIG. 1) from the buffer storage units UST1, UST2 to the reciprocating lift EA. If not, these two transfers are made successively; and/or a transfer of second loads from the reciprocating lift EA to the outbound forward conveyor CAS at the same time as a transfer of third loads (not shown in FIG. 1) from the inbound forward conveyor CAE to the reciprocating lift EA. If not, these two transfers are done successively.

This combination of first and second movements of loads increases the operating rate of the buffer storage and sequencing system.

Figure 1:
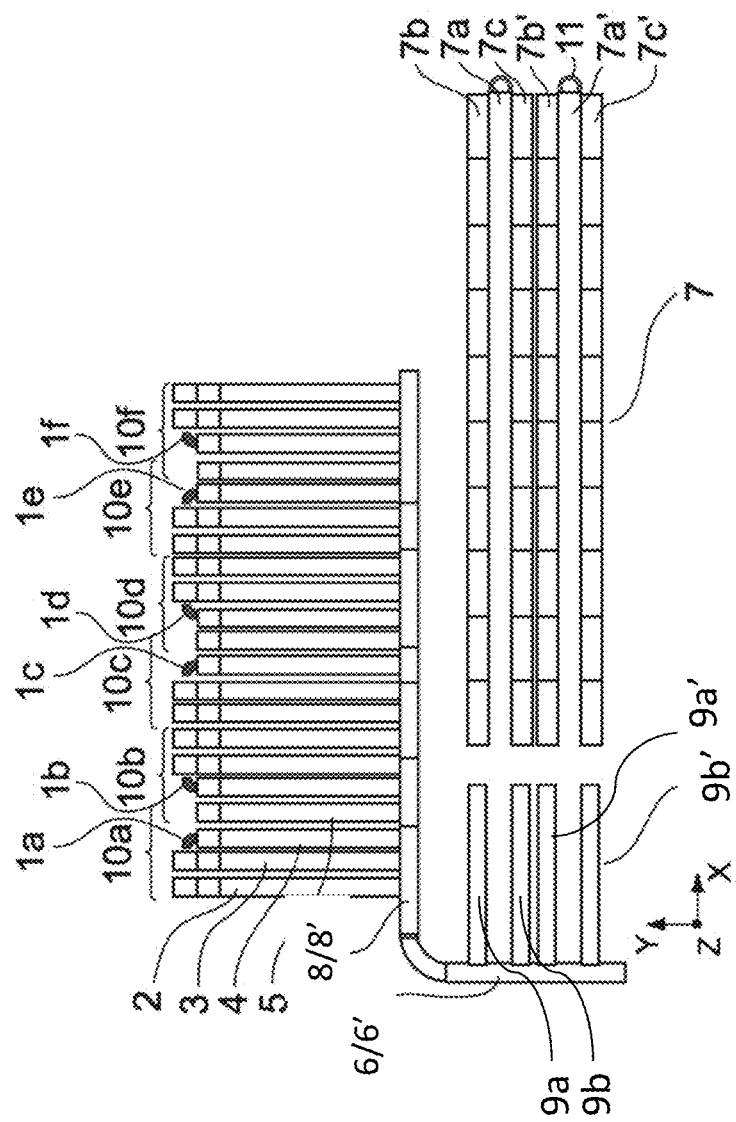

In FIG. 1 (and also in the other figures described here below), certain loads are referenced with letters ("a", "b", "c" and "d") to illustrate the working of the system. In order to show successive positions of a same load on the same figure, the following notation is used: for a first position, the load is referenced only with its associated letter (for example "a"), for a second position, the load is referenced with its associated letter followed by the prime symbol (for example a'), for a third position, the load is referenced with its associated letter followed by the double prime symbol (for example a"), etc. Thus, in FIG. 1, the load "a" is placed first of all on the inbound forward conveyor CAE and then on the reciprocating lift EA (it is then denoted as a') and finally in one of the buffer storage units UST1, UST2 (it is then denoted as a").

Figure 3:
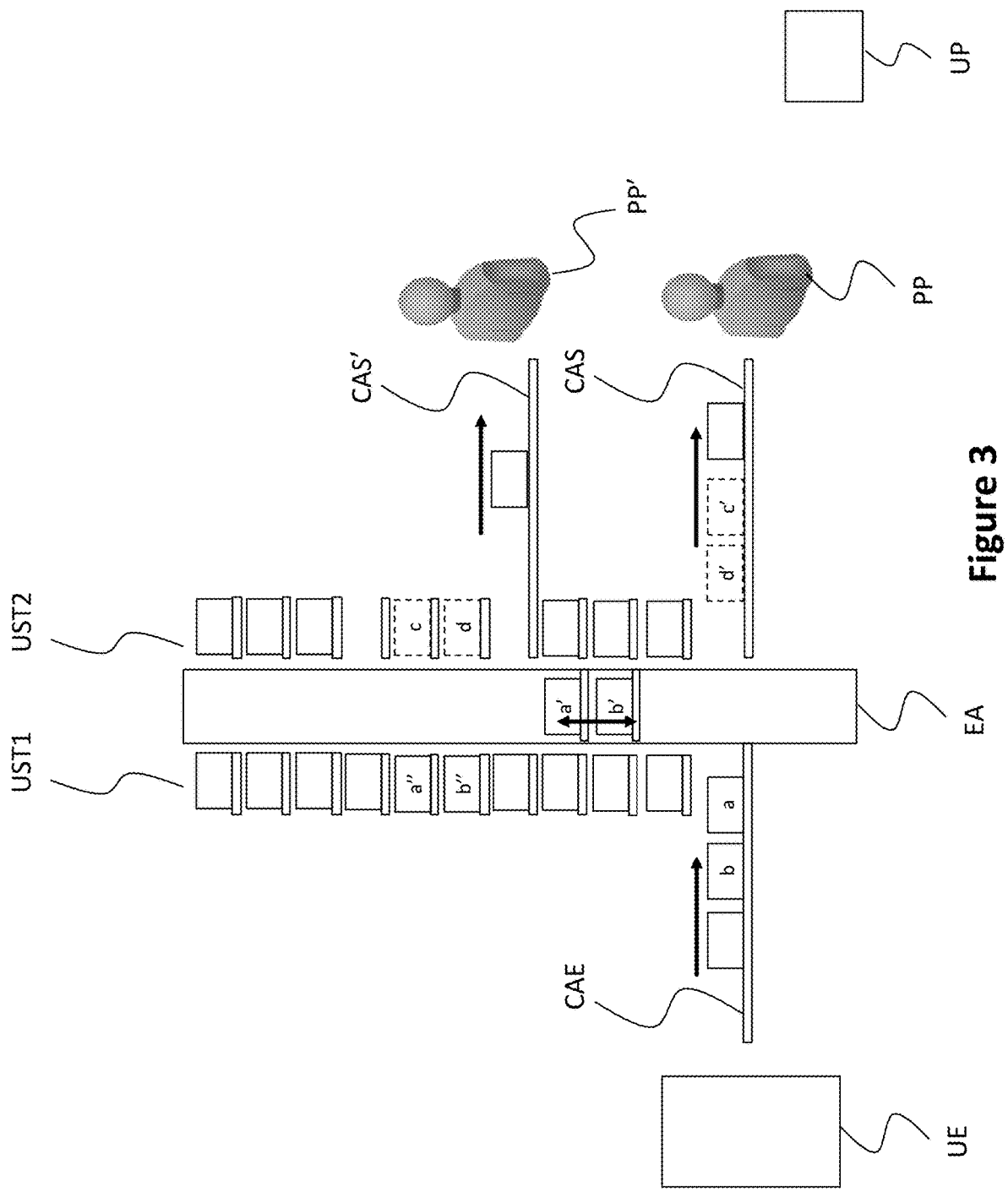
FIG. 3 is a side view of a second example of a buffer storage and load sequencing system according to the invention.

FIG. 3 illustrates a second example of a buffer storage and load sequencing system according to the invention. It is distinguished from the first example illustrated in FIG. 1 in that it provides sequenced loads also to another preparing station PP', through another outbound forward conveyor CAS'. The two outbound forward conveyors CAS, CAS' are situated on two different levels. In one variant, the number of preparing stations is greater than 2. In another variant, a same outbound forward conveyor CAS is used in combination with an appropriate switching system to serve several preparing stations.

Figure 4:
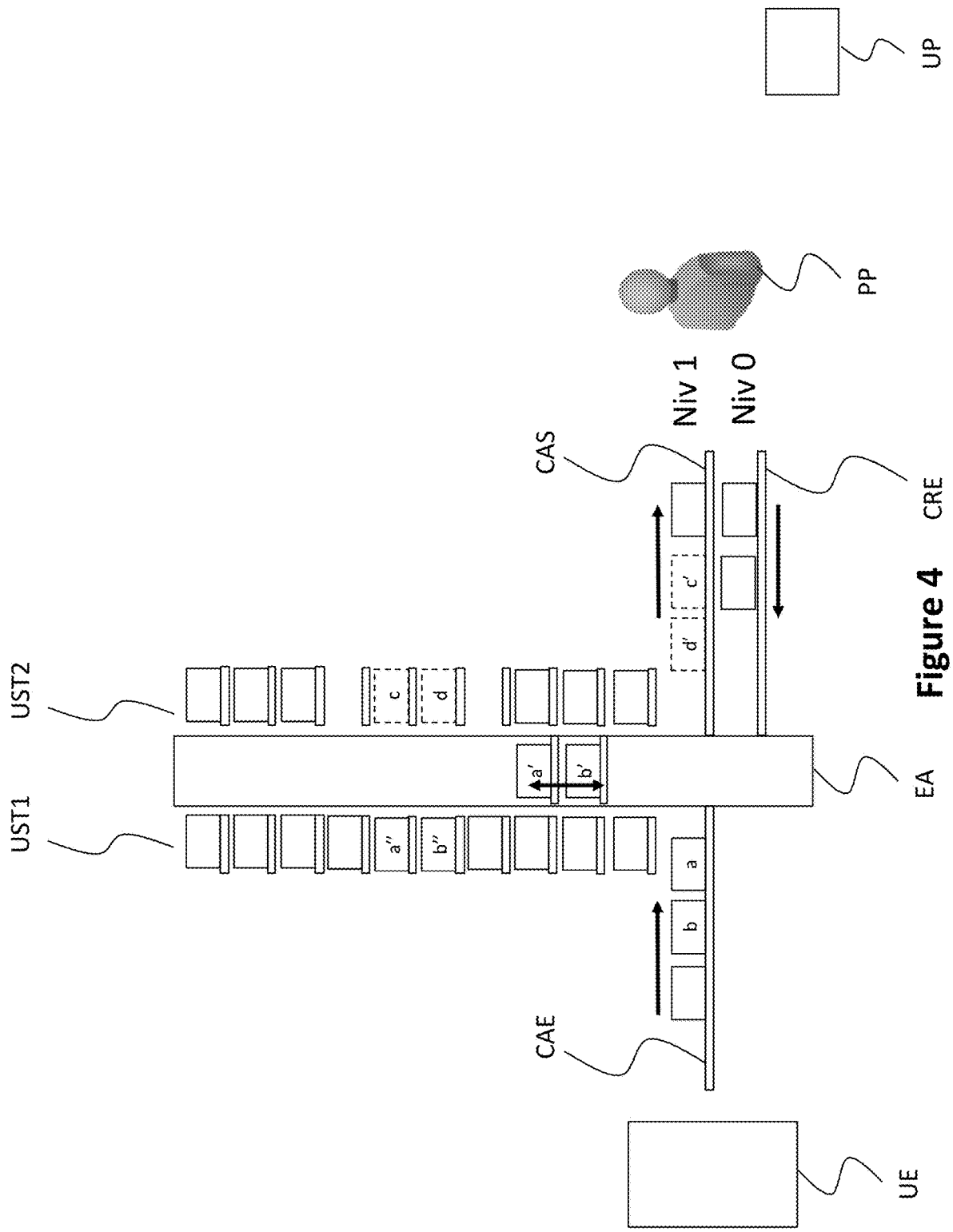
FIG. 4 is a side view of a third example of a buffer storage and load sequencing system according to the invention.

FIG. 4 illustrates a third example of a buffer storage and load sequencing system according to the invention. It is distinguished from the first example illustrated in FIG. 1 in that it comprises an inbound return conveyor CRE enabling the return towards the reciprocating lift EA of loads that have been processed by the preparing station PP.

In this example, the inbound return conveyor CAE and the outbound forward conveyor CAS are positioned at a same height (level reference "Niv 1") on either side of the reciprocating lift EA. The inbound return conveyor CRE is positioned at a lower height (level reference "Niv 0"). The outbound forward conveyor CAS and the inbound return conveyor CRE are parallel and vertically adjacent. In one particular implementation, they have a vertical distance between them equal to a vertical distance between two successive levels of the nacelle of the reciprocating lift EA.

For loads returning from the preparing station PP, the managing unit UP is configured to furthermore organize third movements of loads from the inbound return conveyor CRE to one or more entities accessible through the reciprocating lift EA, especially:

the buffer storage units UST1, UST2 for loads that have to be stored again; and, the outbound forward conveyor CAS for loads having to be again presented to the preparing station PP under delivery constraint (sequencing constraint).

In one variant of the third example of the buffer storage and load sequencing system, the nacelle of the reciprocating lift comprises a single level comprising one or more load locations . . . .

Figure 5:
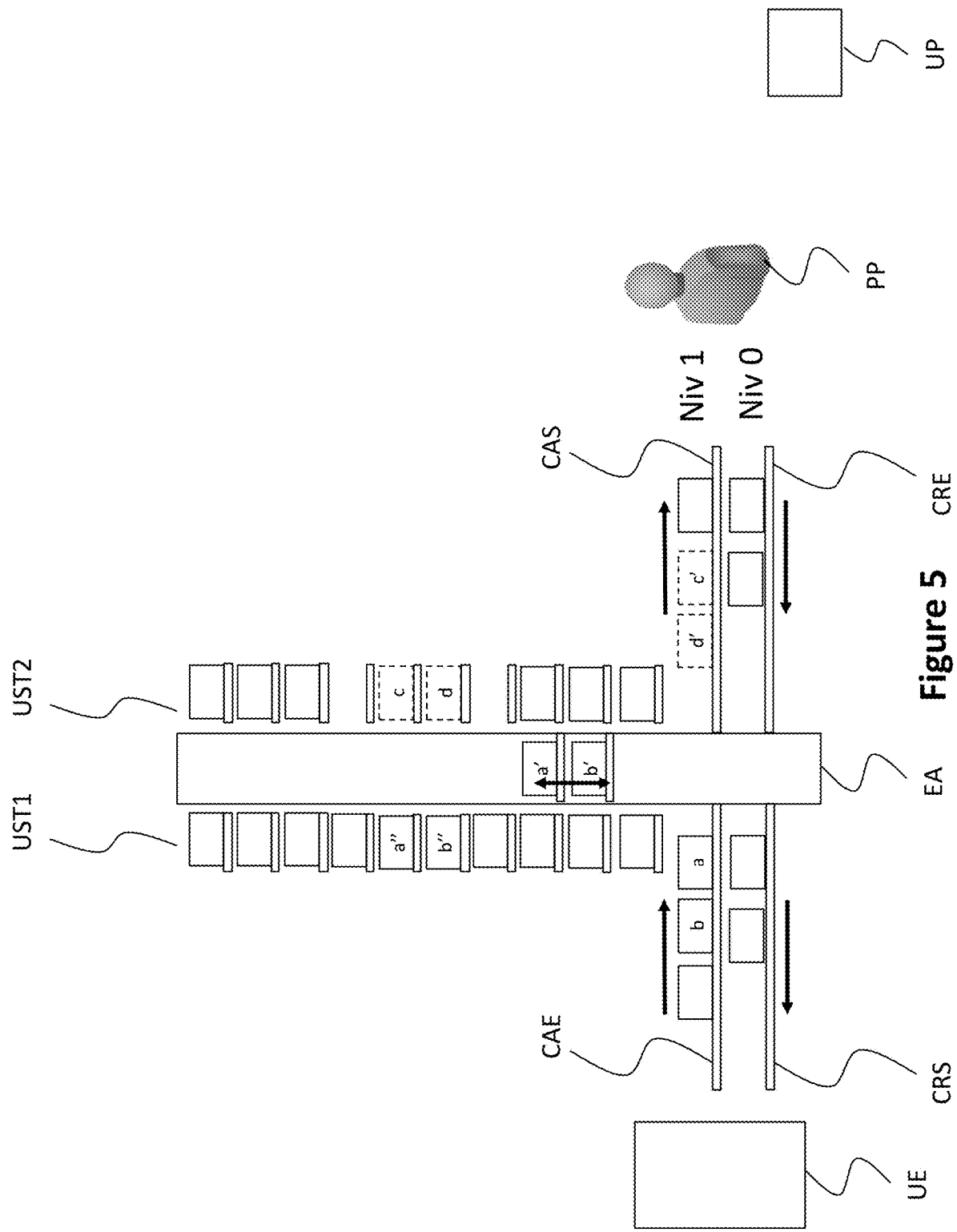
FIG. 5 is a side view of a fourth example of a buffer storage and load sequencing system according to the invention.

FIG. 5 illustrates a fourth example of a buffer storage and load sequencing system according to the invention. It can be distinguished from the third example illustrated in FIG. 4 by the fact that it comprises an outbound return conveyor CRS for loads that have to be sent back to the external unit UE. In one variant, there are several outbound return conveyors each enabling a return of loads to one particular external unit. The external unit (or each of the external units) is an additional entity towards which the control unit UP can organize the third movements of loads, for loads returning to the preparing station PP.

In this example, the outbound return conveyor CRS and the inbound return conveyor CRE are positioned at a same height (level referenced "Niv 0") on either side of the reciprocating lift EA. The inbound forward conveyor CAE and the outbound return conveyor CRS are parallel and vertically adjacent. In one particular implementation, they have a distance between them equal to a vertical distance between two successive levels of the nacelle of the reciprocating lift EA.

Thus, several types of returns are possible, minimizing the use of said at least one external unit and further improving the reactivity of the overall system:

first returns towards the buffer storage units UST1, UST2;

second returns towards the preparing station PP (via the outbound forward conveyor); and third returns towards the external unit UE or else towards at least one other preparing station, or again towards one other external unit (another automated storage/removal warehouse or other buffer storage and load sequencing system).

In one particular implementation, a part of the second movements of loads is carried out at same time as a part of a third movements of loads. Similarly, a part of the third movements of loads is made at the same time as a part of the first movements of loads.

For example, the managing unit UP is configured to organize whenever possible:

a transfer of first loads from the reciprocating lift EA towards the buffer storage units UST1, UST2 at the same time as a transfer of second loads from the buffer storage units UST1, UST2 to the reciprocating lift EA. If not, these two transfers are made successively;

a transfer of the second loads from the reciprocating lift EA towards the outbound forward conveyor CAS at the same time as the transfer of third loads from the inbound return conveyor CRE towards the reciprocating lift EA. If not, these two transfers are made successively:

a transfer of the third loads from the reciprocating lift towards the outbound return conveyor CRS or the buffer storage units UST1, UST2 at the same time as a transfer of the fourth loads from the inbound forward conveyor CAE towards the reciprocating lift EA or the buffer storage units UST1, UST2. If not, these two transfers are made successively.

This combination of first, second and third movements of loads increases the operating rate of the buffer storage and sequencing system.

In one variant of the fourth example of the buffer storage and load sequencing system, the nacelle of the reciprocating lift comprises a single level comprising one or more load locations.

Figure 6:
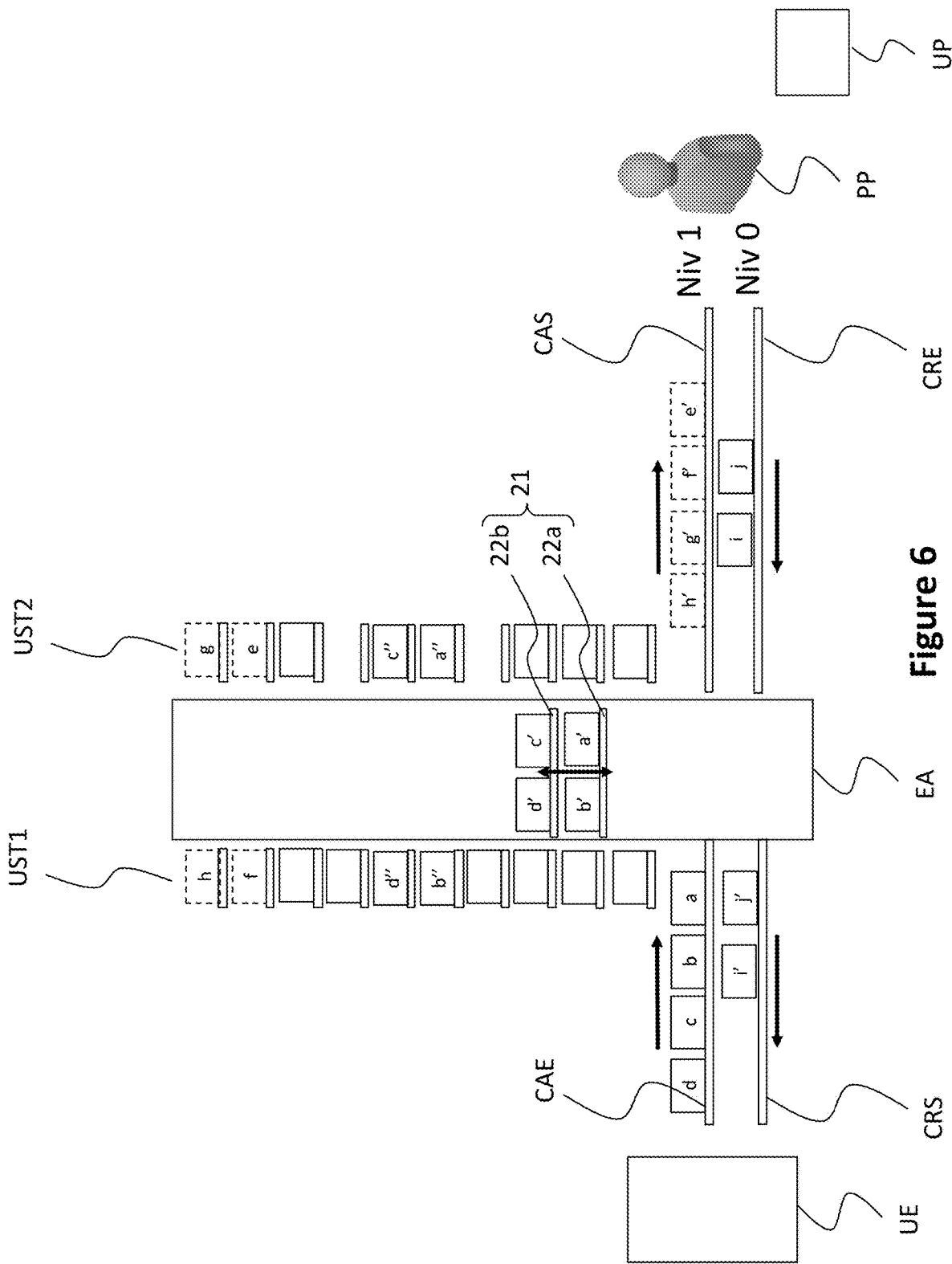
FIG. 6 is a side view of a fifth example of a buffer storage and load sequencing system according to the invention.

FIG. 6 illustrates a fifth example of a buffer storage and load sequencing system according to the invention, it is distinguished from the fourth example illustrated in FIG. 5 by the fact that each level 22a, 22b of the single nacelle 21 of the reciprocating lift EA comprises a row of two locations. The reciprocating lift therefore has a capacity of K×L loads with K being the number of levels and L being the number of loads per level (in the example illustrated in FIG. 6, the capacity is 2×2 loads).

Figure 7:
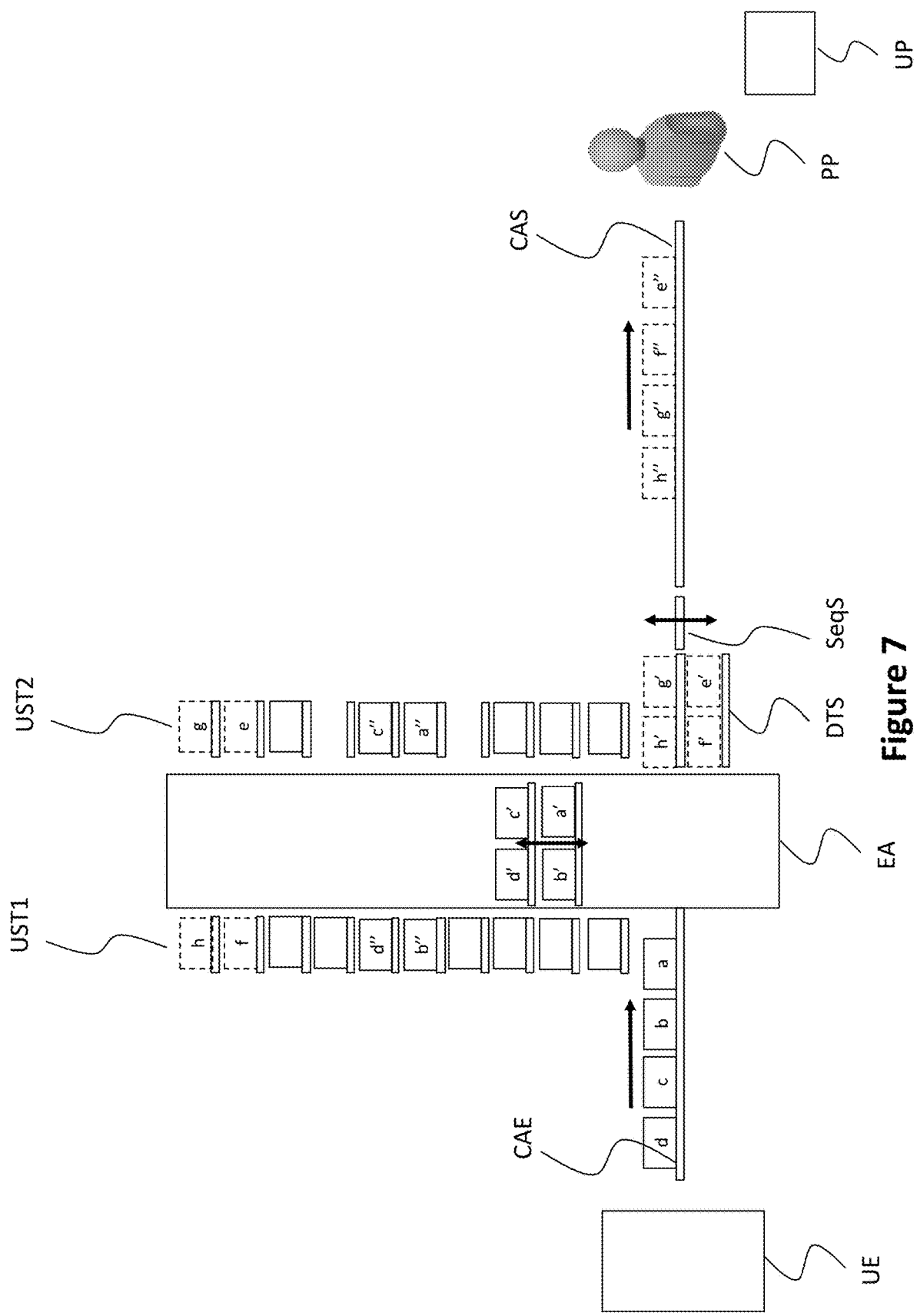
FIG. 7 is a side view of a sixth example of a buffer storage and load sequencing system according to the invention.

FIG. 7 illustrates a sixth example of a buffer storage and load sequencing system according to the invention. It is distinguished from the fifth example illustrated in FIG. 6 by the fact that it comprises, between the reciprocating lift EA and the outbound forward conveyor CAS, an outbound transfer device DTS and an outbound sequencer SeqS. Besides, in this sixth example, the system comprises neither the inbound return conveyor CRE nor the outbound return conveyor CRS. In one variant, it comprises them.

The outbound transfer device DTS comprises two levels, each making it possible to receive two loads. More generally, it comprises the same number K of levels as the reciprocating lift, and each of these levels can receive the same number L of loads as each of the levels of the reciprocating lift. Each of the locations of the outbound transfer device DTS is for example equipped with a motor-driven conveyor section (or any transfer device) enabling a load to be transferred on to or out of the outbound transfer device DTS. In one variant, each of these locations is equipped with idle rollers or idlers, which are put into motion for example by a collapsible mechanical means positioned at the end of another device (conveyor or reciprocating lift). Other means of putting into motion can be envisaged. To carry out a simultaneous transfer of K×L loads at most (2×2 loads in the example of FIG. 7), the K levels of the reciprocating lift EA are aligned with the K levels of the outbound transfer device DTS.

The outbound sequencer SeqS is provided with vertical shifting means. It is capable of transferring loads between the outbound transfer device DTS and the outbound forward conveyor CAS. The outbound sequencer SeqS is a device such as a lift table with platform or any other equivalent device that enables the vertical shifting of a load. In this example, the outbound sequencer SeqS comprises a single level (i.e. a single platform) that is equipped with a motor-driven conveyor portion enabling the horizontal shifting of a load.

The managing unit UP is configured to manage:
 a transfer of a group of N loads from the buffer storage units UST1, UST2 towards the reciprocating lift EA with N being smaller than or equal to a capacity C, in number of loads ((C=K×L), of the reciprocating lift EA. For each group of N loads, the sequencing of the loads placed at each level of reciprocating lift is consistent with the delivery constraint (sequencing constraint on the outbound forward conveyor CAS). Thus, the sequencing of the loads on each level of the reciprocating lift (a sequencing that is preserved at each level of the outbound transfer device) simplifies the sequencing function carried out by the outbound sequencer;
 a transfer, simultaneously on all K levels, of each group of N loads from the reciprocating lift EA to the outbound transfer device DTS; and
 a transfer of each group of N loads, through the outbound sequencer SeqS, from the outbound transfer device DTS to the outbound forward conveyor CAS under delivery constraint (sequencing constraint).

In this sixth example, for the transfer of loads from the reciprocating lift EA to the preparing station PP, the reciprocating lift is therefore used in combination with two other elements:
 an outbound transfer device DTS that fulfills a complementary buffer function enabling a group of N loads to be kept waiting after they are unloaded by the reciprocating lift; and
 an outbound sequencer SeqS that takes part in the performance of the sequencing function.

This combination of three elements significantly increases the general operating rate of the buffer storage and sequencing system while complying with sequencing constraints.

In one variant, the outbound transfer device DTS is provided with vertical shifting means (such as an reciprocating lift with platform or any other equivalent means enabling the vertical shifting of the loads between two or more levels) and replaces the output sequencer SeqS. This variant is therefore more compact and reduces the equipment needed. The managing unit UP is configured to manage a transfer of each group of N loads directly from the outbound transfer device DTS to the outbound forward conveyor CAS. For example, the high level of the outbound transfer device DTS is horizontally aligned with the outbound forward conveyor CAS to unload two loads (for example "e" and "f"), and then the low level of the outbound transfer device DTS gets horizontally aligned with the outbound forward conveyor CAS to unload two other loads (for example "g" and "h") thus complying with the sequence.

Figure 8:
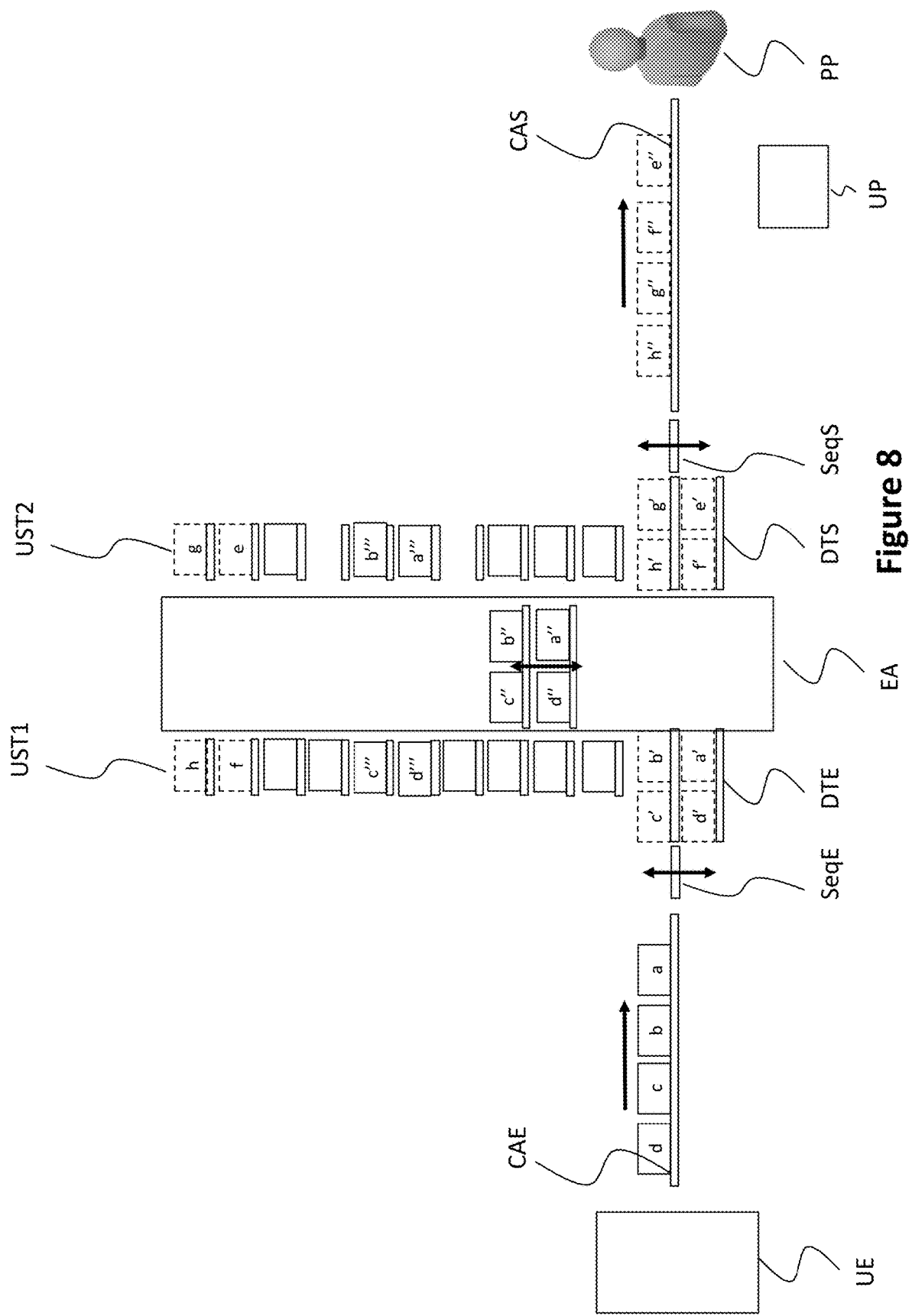
FIG. 8 is a side view of a seventh example of a buffer storage and load sequencing system according to the invention.

FIG. 8 illustrates a seventh example of a buffer storage and load sequencing system according to the invention. It is distinguished from the sixth example illustrated in FIG. 6 by the fact that it comprises, between the inbound forward conveyor CAE and the reciprocating lift EA, an inbound transfer device DTR and an inbound sequencer SeqE.

The inbound transfer device DTE comprises two levels enabling each of them to receive two loads. More generally, it comprises the same number K of levels as the reciprocating lift and each of its levels can receive the same number L of loads as each of the levels of the reciprocating lift. Each of the locations of the inbound transfer device DTE is for example equipped with a motor-driven conveyor section (or any other transfer device) enabling the transfer of a load on to or out of the inbound transfer device DTE. In one variant, each of these locations is equipped with idle rollers or idlers, which are put into motion for example by a collapsible mechanical means positioned at the end of another device (conveyor or reciprocating lift). Other means for putting into motion can be envisaged. To carry out a simultaneous transfer of a maximum of K×L loads (2×2 loads in the example of FIG. 8), the K levels of the reciprocating lift EA are aligned with the K levels of the inbound transfer device DTE.

The inbound sequencer is provided with vertical shifting means. It is capable of transferring loads between the inbound forward conveyor CAE and the inbound transfer device DTE. The inbound sequencer SeqE is a device such as a lift table with platform or any other equivalent device enabling the vertical shifting of a load. In this example, the inbound sequencer SeqE comprises a single level (i.e. a single platform) that is equipped with a motor-driven conveyor portion enabling the horizontal shifting of a load.

The managing unit UP is configured to manage:

a transfer of loads via the inbound sequencer SeqE from the inbound forward conveyor CAE to the inbound transfer device DTE in forming groups of N' loads, in the inbound transfer device, distributed over the different levels with N' being lower than or equal to the capacity C, in number of loads (C=K×L), of the reciprocating lift. For each group of N' loads, the sequencing of the loads placed at each level of the inbound transfer device DTE is consistent with a constraint oft deposition of the N' loads in the buffer storage units UST1, UST2. Thus, the sequencing of the loads at each level of the inbound transfer device DTE (a sequencing that is preserved at each level of the reciprocating lift) simplifies the performance of the constraint of deposition of N' loads (in the buffer storage units);

a transfer, simultaneously on the K levels of each group, of N' loads from the inbound transfer device DTE to the reciprocating lift; and a transfer of each group of N' loads from the reciprocating lift to the buffer storage units UST1, UST2 under the constraint of deposition of the N' loads.

In this seventh example, for the transfer of loads from the external unit UE to the reciprocating lift EA, the reciprocating lift is therefore used in combination with two other elements:

an inbound transfer device DTE which carries out a complementary buffer function enabling a group of N loads to be kept waiting before they are loaded on the reciprocating lift which itself is also a multi-level elevator; and an inbound sequencer SeqE which enables the transfer of the loads in a determined sequential order towards the inbound transfer device DTE.

This combination of three elements optimizes the general operating rate of the buffer storage and sequencing system while complying with the constraints of placing the loads in the buffer storage units UST1, UST2.

In one variant, the inbound transfer device DTE is provided with vertical shift means (reciprocating lift with platform type means or any other equivalent means enabling the vertical shifting of the loads between two or more levels) and replaces the inbound sequencer SeqE. This variant is therefore more compact and reduces the amount of equipment needed. The managing unit UP is configured to drive a transfer of each group of N' loads directly from the inbound forward conveyor CAE to the inbound transfer device DTE. For example, the low level of the inbound transfer device DTE is horizontally aligned with the inbound forward conveyor CAE to load a load (for example "a") and then the high level of the inbound transfer device DTE gets aligned horizontally with the inbound forward conveyor CAE to unload another load (for example "b") etc.

Figure 9:
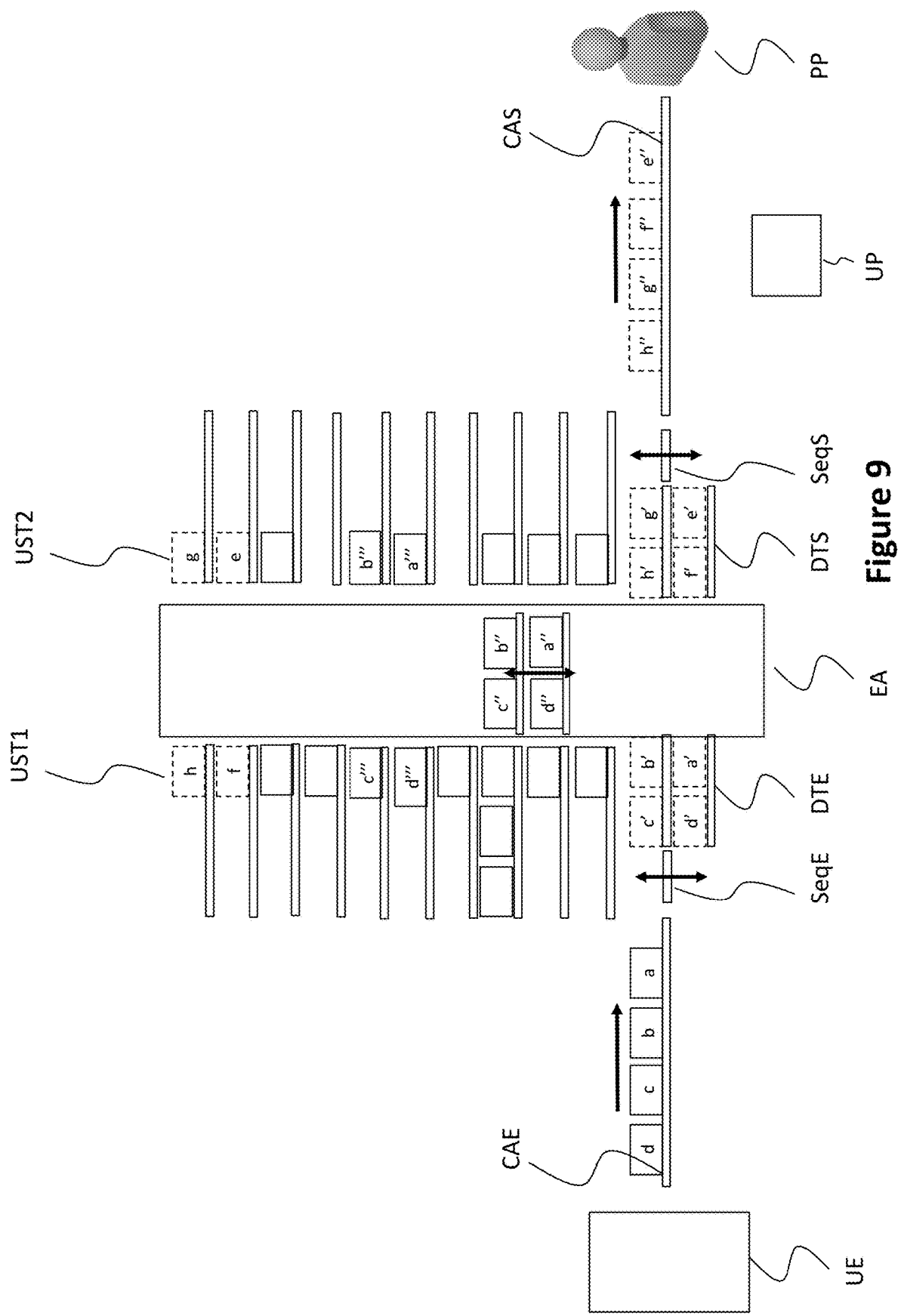
FIG. 9 is a side view of an eighth example of a buffer storage and load sequencing system according to the invention.

FIG. 9 illustrates an eighth example of a buffer storage and load sequencing system according to the invention. It is distinguished from the seventh example illustrated in FIG. 8 in that each of the two buffer storage units UST1, UST2 is a multi-load unit, i.e. it comprises several (for example three) buffer locations.

FIGS. 10a, 10b and 10c illustrate a ninth example of a buffer storage and load sequencing system according to the invention. It is distinguished from the fifth example illustrated in FIG. 6 in that the inbound forward conveyor CAE and the outbound return conveyor CRS are positioned at a same height (level referenced "Niv 2") on either side of the reciprocating lift EA.

FIGS. 11a, 11b and 11c illustrate a tenth example of a buffer storage and load sequencing system according to the invention. It is distinguished from the ninth example illustrated in FIGS. 10a, 10b and 10c in that the inbound forward conveyor CAE and the outbound return conveyor CRS are parallel and vertically adjacent. In one particular implementation, they have a vertical distance between them equal to a vertical distance between two successive levels of the nacelle of the reciprocating lift EA. In this example, the inbound forward conveyor CAE is positioned at a height (level referenced "Niv 3") that is higher than the level (level reference "Niv 2") of the outbound return conveyor CRS.

FIGS. 12a, 12b and 12c illustrate an eleventh example of a buffer storage and load sequencing system according to the invention. It is distinguished from the ninth example illustrated in FIGS. 10a, 10b and 10c in that:

the nacelle of the reciprocating lift comprises a single level with two rows of two load locations. In FIG. 12b (seen from the top) one row contains the loads "a" and "b" and the other row contains the loads "i" and "j";

the outbound forward conveyor CAS and the inbound return conveyor CRE are parallel and horizontally adjacent (at the level referenced "Niv 0") and have a horizontal distance between them equal to a horizontal distance between the two rows of the single level of the nacelle of the reciprocating lift EA. The positioning of these conveyors CAS and CRE relative to the reciprocating lift EA is such that it is possible to simultaneously carry out transfers of loads on the one hand between the outbound forward conveyor CAS and one of the two rows of a single level of the nacelle of the reciprocating lift EA, and, on the other hand, between the inbound return conveyor CRE and the other of the two rows of the single level of the nacelle of the reciprocating lift EA;

the inbound forward conveyor CAE and the outbound return conveyor CRS are parallel, horizontally adjacent (at the level referenced "Niv 1") and have a horizontal distance between them equal to the horizontal distance between the two rows of the single level of the nacelle of the reciprocating lift EA. The positioning of these conveyors CAE and CRS relative to the reciprocating lift EA is such that it is possible to simultaneously carry out transfers of loads, on the one hand between the inbound forward conveyor CAE and one of the two rows of the single level of the nacelle of the reciprocating lift EA, and, on the other hand, between the outbound return conveyor CRS and the other of the two rows of the single level of the nacelle of the reciprocating lift EA.

FIGS. 13a, 13b and 13c illustrate a twelfth example of a buffer storage and load sequencing system according to the invention. It is distinguished from the eleventh example illustrated in FIGS. 12a, 12b and 12c in that the nacelle of the reciprocating lift comprises K levels with K≥2 (in the example illustrated in FIGS. 13a, 13b and 13c we have K=2), each comprising two rows of two load locations. In FIG. 13b (top view), the high level of the nacelle of the reciprocating lift comprises a first row that contains the loads "c" and "d" and a second row that contains the loads "i" and "g". As can be seen partially in FIG. 13b (in a side view), the low level of the nacelle of the reciprocating lift comprises a first row that contains the loads "a" and "b" and a second row that contains the loads "k" and "l".

The twelfth example also illustrates the possibility that the system comprises one or more pairs of additional conveyors each associating an inbound forward conveyor and an outbound return conveyor and enabling exchanges (forward and return) of loads with another external unit (not shown). This other external unit is for example an automated storage/removal warehouse or another buffer storage and load sequencing system.

Thus, in FIGS. 13a, 13b and 13c, the system comprises a first pair of additional conveyors denoted CAE' and CES' positioned at the level referenced "Niv 1" and a second pair of additional conveyors denoted CAE" and CRS" positioned at the level referenced "Niv 2".

The configuration of each of the ninth, tenth, eleventh and twelfth examples makes it possible to combine the return of the loads from the preparing station PP towards the outbound return conveyor or conveyors CRS (CRS' CRS") or the buffer storage units UST1, UST2 with minimum disturbance of the flow of sequenced loads on the outbound forward conveyor CAS.

Figure 14:
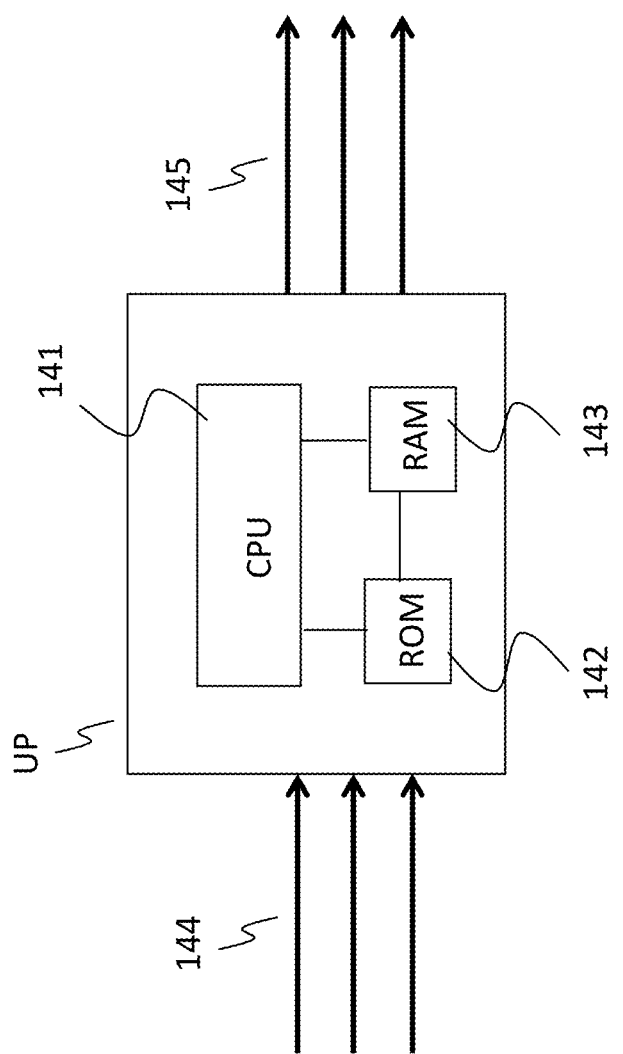
FIG. 14 is an example of a structure for a managing unit according to one particular embodiment of the invention.

FIG. 14 represents an example of a structure of the above mentioned managing unit UP according to one particular embodiment of the invention. The managing unit UP comprises a random-access memory 143 (for example a RAM), a processing unit 141 equipped for example with a processor and driven by a computer program stored in a read-only memory 142 (for example a ROM or a hard disk drive). At initialization, the code instructions of the computer program are for example loaded into the random-access memory 143 and then executed by the processor of the processing unit 41. The processing unit 41 receives input signals 44, processes them and generates output signals 45.

The input signals 144 include various pieces of information on the working of the general system (comprising especially the external unit or units), the buffer storage and sequencing system and the preparing stations, especially the load identifiers read (by the reading devices such as the barcode reader, RFID label reader etc) on the loads when they pass to different places of the general system (for example to the extremities of the different conveyors).

The output signals 145 comprise various pieces of control information for the managing (control) of the devices of the general system (especially within the buffer storage and sequencing system), in order to manage the movements of loads within the general system.

This FIG. 14 illustrates only one particular implementation amongst several possible implementations. Indeed, the managing unit UP can be made equally well on a reprogrammable computing machine (a PC computer, a DSP processor or a microcontroller) executing a program comprising a sequence of instructions and/or on a dedicated computation machine (for example a set of logic gates such as an FPGA or an ASIC or any other hardware module). Should the managing unit be at least partly implanted on a reprogrammable computing machine, the corresponding program (i.e. the sequence of instructions) could be stored in a detachable storage medium (such as for example a floppy disk, a CD-ROM or a DVD-ROM) or non-detachable storage medium, this storage medium being partially readable or totally readable by a computer or a processor.

The invention claimed is:

1. A system of buffer storage and sequencing of loads configured to receive non-sequenced loads coming from at least one external unit through at least one inbound forward conveyor included in said system and to provide at least one predetermined sequence of loads, comprising loads in a predetermined sequential order, to at least one preparing station, through at least one outbound forward conveyor included in said system, wherein said system comprises:
    a reciprocating lift comprising only one nacelle comprising K levels each enabling the transportation of at least one load, with K≥2;
    at least one buffer storage unit comprising a plurality of buffer locations distributed over a plurality of levels and each configured to temporarily receive at least one load coming from the only one nacelle of the reciprocating lift; and
    a managing unit configured to organize:
        first movements of loads from said at least one inbound forward conveyor to said at least one buffer storage unit, through the only one nacelle of the reciprocating lift; and;
        second movements of loads from said at least one buffer storage unit to said at least one outbound forward conveyor, through the only one nacelle of the reciprocating lift, under a constraint of delivery, on said at least one outbound forward conveyor, of said at least one predetermined sequence of loads,
    wherein each of the K levels of the only one nacelle of the reciprocating lift is able to come next to each of the levels of the at least one buffer storage unit for a transfer of at least one load,
    wherein said first movements of loads comprise, for a given load, a movement of said given load from one of the K levels of the only one nacelle of the reciprocating lift directly to one of the buffer locations of said at least one buffer storage unit,
    and wherein said second movements of loads comprise, for a given load, a movement of said given load from one of the buffer locations of said at least one buffer storage unit directly to one of the K levels of the only one nacelle of the reciprocating lift.

2. The system according to claim 1, wherein a part of the first movements of loads is carried out at the same time as a part of the second movements of loads.

3. The system according to claim 1, wherein the managing unit is configured furthermore to organize third movements of loads through the only one nacelle of the reciprocating lift, for loads that have been treated by said at least one preparing station, from at least one inbound return conveyor, included in said system, towards at least one of the entities belonging to the group consisting of:
    said at least one buffer storage unit for loads that have to be stored again;
    said at least one outbound forward conveyor or loads having to be again presented to said at least one preparing station, under said constraint of delivery; and
    at least one outbound return conveyor included in said system, for loads that have to be sent back to at least one of the entities belonging to the group consisting of said at least one external unit, at least one other preparing station and at least one other external unit.

4. The system according to claim 3, wherein a part of the second movements of loads is carried out at same time as a part of a third movements of loads and wherein a part of the third movements of loads is carried out at same time as a part of the first movements of loads.

5. The system according to claim 3, wherein each of the K levels of the only one nacelle of the reciprocating lift comprises a row of at least two load locations, and wherein the system comprises at least one pair comprising an outbound forward conveyor and an inbound return conveyor that are parallel and vertically adjacent.

6. The system according to claim 3, wherein each of the K levels of the only one nacelle of the reciprocating lift comprises two rows of at least two load locations, and the system comprises at least one pair comprising an outbound forward conveyor and an inbound return conveyor that are parallel and vertically adjacent and have a horizontal distance between them equal to a horizontal distance between two rows of each of the K levels of the only one nacelle of the reciprocating lift.

7. The system according to claim 3, wherein each of the K levels of the only one nacelle of the reciprocating lift comprises a row of at least two load locations, and the system comprises at least one pair comprising an inbound forward conveyor and an outbound return conveyor that are parallel and vertically adjacent.

8. The system according to claim 3, wherein each of the K levels of the only one nacelle of the reciprocating lift comprises a row of at least two load locations, and the system comprises at least one pair comprising an inbound forward conveyor and an outbound return conveyor that are positioned at a same height on either side of the reciprocating lift.

9. The system according to claim 3, wherein each of the K levels of the only one nacelle of the reciprocating lift comprises two rows of at least two load locations, and the system comprises at least one pair comprising an inbound forward conveyor and an outbound return conveyor that are parallel, horizontally adjacent and have a horizontal distance between them equal to a horizontal distance between two rows of each of the K levels of the only one nacelle of the reciprocating lift.

10. The system according to claim 1, wherein the system comprises two buffer storage units disposed vertically on either side of the reciprocating lift and each comprising a plurality of levels each comprising at least one buffer location, each of the K levels of the only one nacelle of the reciprocating lift being able to come into a position facing each of the levels of each of the buffer storage units for a transfer of at least one load.

11. The system according to claim 1, wherein the system comprises, between the reciprocating lift and said at least one outbound forward conveyor:
an outbound transfer device comprising K levels enabling each one to receive at least one load; and
an outbound sequencer provided with a vertical shifting device; and wherein the managing unit is configured to manage:
a transfer of a group of N loads from at least one buffer storage unit towards the only one nacelle of the reciprocating lift with N being smaller than or equal to a capacity of the only one nacelle of the reciprocating lift in number of loads;
a transfer, simultaneously on all K levels, of each group of N loads from the only one nacelle of reciprocating lift to the outbound transfer device; and
a transfer of each group of N loads, through the outbound sequencer, from the outbound transfer device to said at least one outbound forward conveyor under the delivery constraint.

12. The system according to claim 11, wherein the outbound transfer device is provided with a vertical shifting device and replaces the output sequencer and wherein the managing unit UP is configured to manage a transfer of each group of N loads directly from the outbound transfer device to the outbound forward conveyor.

13. The system according to claim 11, wherein the reciprocating lift is a multi-load lift at each level of the only one nacelle, and wherein the managing unit is configured to manage, for each group of N loads, a sequencing of the loads placed at each level of the only one nacelle of the reciprocating lift, said sequencing being consistent with said delivery constraint.

14. The system according to claim 1, further comprising, between said at least one inbound forward conveyor and the reciprocating lift:
an inbound transfer device comprising K levels enabling each to receive at least one load; and
an inbound sequencer provided with a vertical shifting device; and wherein the managing unit is configured to manage:
a transfer of loads, via the incoming sequencer, from said at least one incoming forward conveyor towards the incoming transfer device, in forming, in the inbound transfer device, groups of N' loads distributed over the K levels, with N' smaller than or equal to a capacity of the only one nacelle of the reciprocating lift in number of loads;
a transfer, simultaneously on the K levels, of each group of N' loads from the incoming transfer device to the only one nacelle of the reciprocating lift; and
a transfer of each group of N' loads, from the only one nacelle of the reciprocating lift to said at least one buffer storage unit, under a constraint of deposition of the N' loads.

15. The system according to claim 14, wherein the incoming transfer device is provided with a vertical shifting device and replaces the incoming sequencer, and wherein the managing unit is configured to manage a transfer of each group of N' loads directly from said at least one incoming forward conveyor to the incoming transfer device.

16. The system according to claim 14, wherein the reciprocating lift is a multi-load lift at each level of the only one nacelle, and the managing unit is configured to manage, for each group of N loads, a sequencing by the incoming sequencer of the loads placed at each level of the incoming transfer device, said sequencing being consistent with said constraint of deposition of the N loads.

* * * * *